(12) United States Patent
Berisko et al.

(10) Patent No.: US 6,214,313 B1
(45) Date of Patent: Apr. 10, 2001

(54) HIGH-PURITY MAGNESIUM HYDROXIDE AND PROCESS FOR ITS PRODUCTION

(75) Inventors: Daniel W. Berisko, Coraopolis; Manyam Babu, Upper St. Clair, both of PA (US)

(73) Assignee: Dravo Lime, Inc., Pittsburgh, PA (US)

( * ) Notice: Subject to any disclaimer, the term of this patent is extended or adjusted under 35 U.S.C. 154(b) by 0 days.

(21) Appl. No.: 09/290,839

(22) Filed: Apr. 13, 1999

(51) Int. Cl.[7] ................................ C01F 5/22; C01F 5/40; C01F 5/42
(52) U.S. Cl. ................ 423/638; 423/243.08; 423/519.2; 423/554
(58) Field of Search ................ 423/638, 243.08, 423/554, 519.2

(56) References Cited

U.S. PATENT DOCUMENTS

| | | |
|---|---|---|
| 1,986,509 | 1/1935 | MacIntire ................ 23/201 |
| 3,127,241 | 3/1964 | Periard et al. ................ 23/201 |
| 3,637,347 * | 1/1972 | Jonakin et al. ................ 423/243.08 |
| 4,098,762 | 7/1978 | Miyata et al. ................ 260/45.7 |
| 4,145,404 | 3/1979 | Miyata et al. ................ 423/635 |
| 4,474,737 | 10/1984 | Najmr et al. ................ 423/155 |
| 4,590,047 * | 5/1986 | Donnelly et al. ................ 423/235 |
| 4,695,445 | 9/1987 | Nakaya et al. ................ 423/635 |
| 4,698,379 | 10/1987 | Nakaya et al. ................ 523/513 |
| 5,143,965 | 9/1992 | Mertz ................ 524/436 |
| 5,270,026 * | 12/1993 | College et al. ................ 423/243.08 |
| 5,286,285 | 2/1994 | Meier et al. ................ 106/18.26 |
| 5,476,642 | 12/1995 | Skubla et al. ................ 423/162 |
| 5,614,158 * | 3/1997 | College ................ 423/243.08 |

FOREIGN PATENT DOCUMENTS

2133694 * 10/1993 (CA) .

* cited by examiner

*Primary Examiner*—Wayne Langel
(74) *Attorney, Agent, or Firm*—Armstrong, Westerman, Hattori, McLeland & Naughton, LLP

(57) ABSTRACT

Magnesium hydroxide of high purity, having a fine particle size suitable for use in flame retardants and other high-end uses, is produced by utilizing flue gas desulfurization system process slurry as feedstock; the production process is absent energy-intensive steps as well as high-cost chemical usage.

12 Claims, 1 Drawing Sheet

HIGH-PURITY MAGNESIUM HYDROXIDE AND PROCESS FOR ITS PRODUCTION

FIELD OF THE INVENTION

The present invention relates to production of high-purity magnesium hydroxide from process slurry of a flue gas desulfurization operation utilizing magnesium-enhanced lime.

BACKGROUND OF THE INVENTION

Production of high-purity magnesium hydroxide (Mg(OH)$_2$) for uses such as flame retardants and pharmaceuticals by known processes involves numerous energy-intensive steps as well as high cost chemical usage. Various processes for such production are described in U.S. Pat. No. 5,476,642; No. 5,286,285; No. 5,143,965; No. 4,698,379; and No. 4,695,445.

In a flue gas desulfurization process, controlling alkalinity of process slurry prevents the formation of scale which is detrimental to the system. Magnesium-enhanced lime is used to increase alkalinity of the process slurry through the formation of magnesium sulfite (MgSO$_3$). Lime presenting a magnesium oxide (MgO) content is selected for such use to enable the formation of the magnesium sulfite. Such process slurry is a lime slurry containing magnesium ions. A portion of such magnesium sulfite laden slurry is bled from the desulfurization system to maintain slurry chemistry. Its disposal can present high costs and environmental concerns.

Such bleed-off slurry provides an economical source of feedstock for the production of high purity magnesium hydroxide.

SUMMARY OF THE INVENTION

The present invention provides for the production of high-purity magnesium hydroxide from process slurry of a flue gas desulfurization process. Such slurry is prepared using lime having a magnesium oxide content. Such magnesium presence enables formation of magnesium sulfite in the process slurry. Control of slurry chemistry during operation of the desulfurization system facilitates recovery of magnesium sulfite hexahydrate crystals (MgSO$_3$.6H$_2$O) presenting a low level of impurities. Such crystals are the source material for the high-purity magnesium hydroxide of the invention.

In the process of the invention magnesium sulfite hexahydrate crystals are converted to an aqueous solution of magnesium sulfate (MgSO$_4$) by a reaction with water and an oxidizing agent. The resulting aqueous solution is then reacted with a caustic solution to precipitate a magnesium hydroxide solid. Such solid precipitate is then separated from the reaction medium solution by filtering means to obtain a magnesium hydroxide filter cake. Entrained solution in the cake is removed and a drying process is used to eliminate residual water from the high-purity magnesium hydroxide product.

BRIEF DESCRIPTION OF THE DRAWINGS

Specific procedures of the invention are described in more detail with reference being made to the accompanying drawing.

In the drawing.

DETAILED DESCRIPTION OF THE INVENTION

Figure 1:
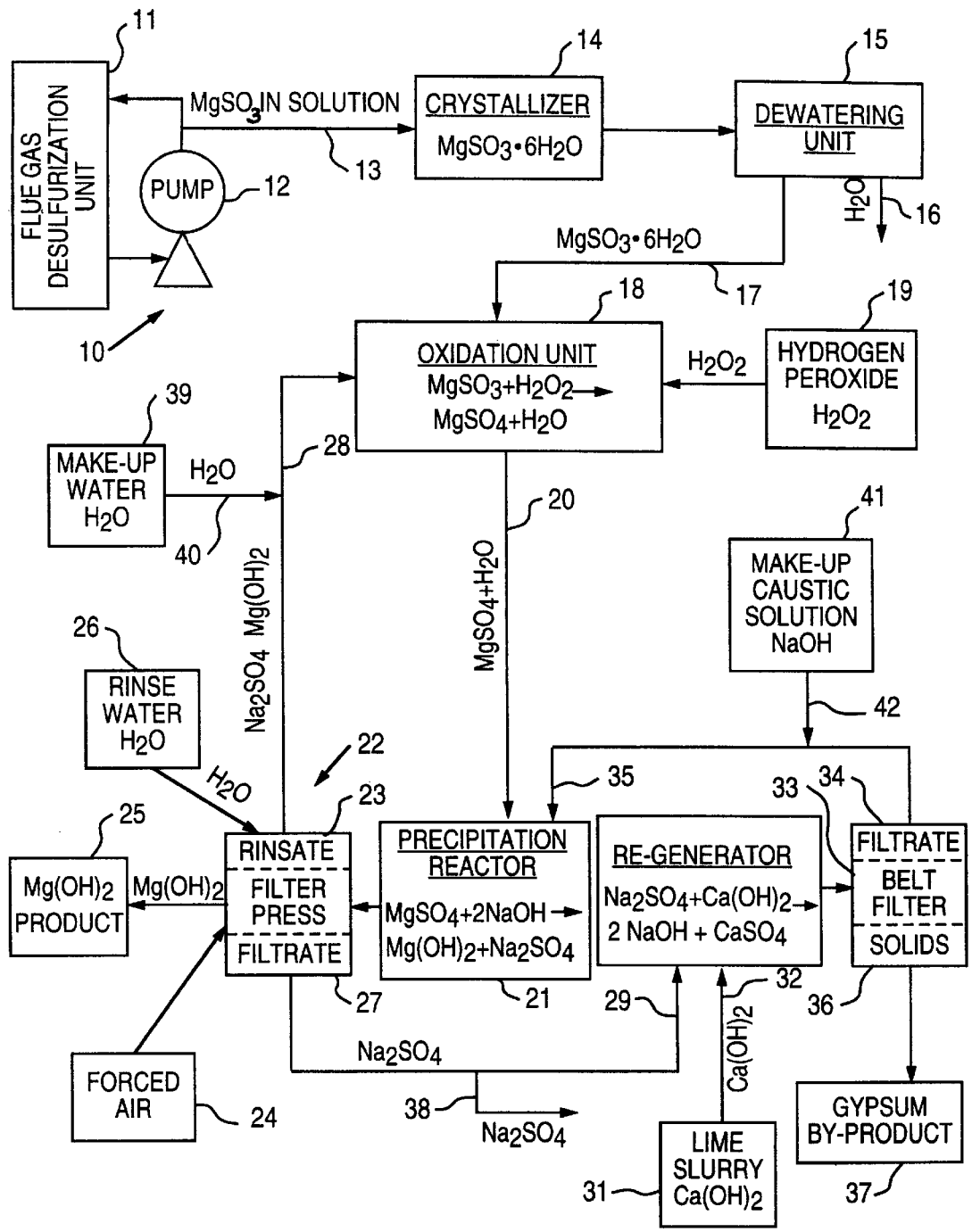
FIG. 1 is a flow diagram for describing processing steps carried out in a preferred semi-continuous embodiment of the invention.

Increasing environmental concerns require desulfurization of industrial flue gases. Such desulfurization process can be carried out using flue gas scrubbing means wherein a gaseous stream containing sulfur dioxide is contacted by an aqueous scrubbing medium referred to as a desulfurization process slurry. Referring to FIG. 1, flue gas scrubbing system indicated generally at reference numeral 10, comprises flue gas desulfurization unit 11 through which sulfur containing gas flows for contact with the aqueous slurry. Such slurry is recirculated through the unit by means of pump 12. Slurry chemistry, during continuous operation, is maintained by addition of chemical components of the slurry in combination with removal or "bleed-off" of a portion of the slurry as indicated at 13. Such bleed-off slurry, which in prior practice presented disposal concerns, provides a source of feedstock for production of high-purity magnesium hydroxide. Magnesium, in the form of magnesium sulfite is present in the slurry to control alkalinity and prevent the formation of scale in the desulfurization system. The slurry is prepared using lime having a presence of about 2–6% by weight of magnesium oxide. Such magnesium oxide leads to the formation of the magnesium sulfite in the slurry during system operation.

Control of slurry chemistry during continuous operation of the system facilitates recovery of high-purity magnesium sulfite hexahydrate crystals from the slurry bleed-off. Slurry chemistry promoting such high-purity hexahydrate crystal formation include:

1. magnesium ion content between about 5,000–12,000 ppm,
2. sulfite content of between about 3,000–18,000 ppm, and
3. a pH of between 6.0 and 7.0.

Those conditions as well as optimum conditions, described below, of a crystallizer of a subsequent step, are found in Canadian Patent No. 2,133,694 which is incorporated herein by reference.

In such subsequent step, carried out in crystallizer 14, bleed-off slurry, which is supersaturated with respect to magnesium sulfite, is treated by lowering the temperature thereof to between about 15 to 40° C. and adjusting the pH to between about 7.0 to 7.5. Such conditions promote production of magnesium sulfite hexahydrate crystals (MgSO$_3$.6H$_2$O) as opposed to magnesium sulfite trihydrate crystals (MgSO$_3$.3H$_2$O). Such hexahydrate crystals, after forming, are separated from the remaining aqueous solution at dewatering unit 15. H$_2$O is removed at line 16 and magnesium sulfite hexahydrate crystals are removed at line 17 for further processing. A low level of impurities characterize these crystals and they provide an excellent source for production of high-purity magnesium hydroxide. Additional steps required for purifying starting materials in prior practice processes are eliminated by such source and the process of the present invention.

Results of chemical analysis of such hexahydrate crystals for impurities is presented in Table I.

TABLE I

| | |
|---|---|
| Cl$^-$ | Less than 100 mg/kg |
| NO$_3$ | Less than 46 mg/kg |
| Ca$^{++}$ | Less than 60 mg/kg |
| Fe | Less than 7 mg/kg |

A preferred embodiment for carrying out the process of the invention using such crystals as feedstock and described with reference to the flow diagram of FIG. 1 is continuous or semi-continuous; however, a batch mode to carry out the process of the invention is not to be ruled out.

Chemical analysis of crystals from crystallizer 14 indicates that the crystals are primarily magnesium sulfite hexahydrate crystals. Such crystals are relatively insoluble in $H_2O$ and are preferably converted to magnesium sulfate ($MgSO_4$) in an oxidation reaction carried out at oxidation unit 18. In such unit, crystals from dewatering unit 15 are combined with hydrogen peroxide ($H_2O_2$) from source 19 for oxidation reaction $MgSO_3+H_2O_2 \rightarrow MgSO_4+H_2O$. In batch tests carried out to determine optimum conditions for operation of the oxidation unit it was determined that a mixture of 50 ml. (~50 gms) of deionized water, 8 gms of magnesium sulfite hexahydrate crystals and 5 ml (~7 gms) of 30% $H_2O_2$ gave the best oxidation results with the least temperature rise. Such results are contained in Table II

TABLE II

| Time (minutes) | Temperature (° C.) | pH |
|---|---|---|
| 0 | 22 | 8.8 |
| 2 | 60 | 6.7 |
| 5 | 57 | 6.7 |
| 15 | 51 | 6.8 |
| 30 | 45 | 7 |

In such batch test sample all the reactants stayed in solution when the sample was cooled and ion chromatography analysis indicated 0 ppm of $SO_3$ and 66569 ppm of $SO_4$.

Operation of the oxidation unit, in light of the results of such batch test, is carried out with proportions of the reactants substantially matching that of the batch test above.

It has been observed that magnesium sulfite hexahydrate crystals from the crystallizer, if not immediately processed in the oxidation step, form a $MgSO_4$ crust on their exposed surface areas. Such oxidation ($MgSO_3 \rightarrow MgSO_4$) is not a detriment to the process as such oxidation reaction is similar to that which takes place in the just described oxidation unit. Therefore, magnesium sulfite hexahydrate crystals can be generated independent of the remaining processing steps and stored under ambient conditions until needed.

The aqueous magnesium sulfate solution from oxidation unit 18 reports at 20 to precipitation reactor 21 in which magnesium hydroxide is precipitated by a reaction with a strong base, such as sodium hydroxide (NaOH), indicated by the reaction $MgSO_4 + 2NaOH \rightarrow Mg(OH)_2 \downarrow + Na_2SO_4$. Sodium hydroxide is the preferred reagent for ease of use and high product yield. However, the use of other strong bases such as ammonia, ammonium hydroxide or potassium hydroxide is not to be ruled out by the invention. In such precipitation reactor, control of pH between about 9.5 and 11.0 or preferably between about 10.5 and 10.7, and reaction conditions characterized by 1) gradual addition of reactants, 2) continuous mixing, and 3) absence of over mixing, promotes precipitation of fine (2–5 micron) sized magnesium hydroxide particles. Such particles are of high purity and suitable for use as flame retardants and other high end uses. Magnesium hydroxide precipitate of such fine particle size, in the preferred embodiment of the process, is separated from the sodium sulfate ($Na_2SO_4$) by a plate and frame filter press or similar device as indicated in FIG. 1 at 22. Following removal of the sodium sulfate, a resultant filter cake is thoroughly rinsed with a high purity (deionized) rinse water, 23, to remove entrained sodium sulfate. The filter cake is then dried using forced air, 24, to remove residual moisture. The resultant high-purity magnesium hydroxide product is removed from the filter press as indicated at 25.

Rinsate and filtrate from such filter press separating step, indicated at 26 and 27 respectively, are utilized within the continuous or semi-continuous system. The rinsate solution which contains traces of $Na_2SO_4$ and $Mg(OH)_2$ reports to the oxidation unit and subsequently to the precipitation reactor, as indicated at 28, for re-use of the chemicals in the oxidation and precipitation reactions. The filtrate, $Na_2SO_4$, reports as indicated at 29 to a sodium hydroxide re-generator 30. In such re-generator the $Na_2SO_4$ is converted to NaOH for use in precipitation reactor 21. Such re-generation is indicated by the reaction $Na_2SO_4 + Ca(OH)_2 \rightarrow 2NaOH + CaSO_4$. $Ca(OH)_2$ is present in the re-generator through the introduction of a lime slurry 31, indicated at 32.

Products of the re-generation reactor are separated by a belt filter, 33, or similar device, to effect liquid and solid separation. The liquid NaOH filtrate 34, regenerated in the regeneration step, reports to precipitation reactor 21, as indicated at 35, for use in precipitating $Mg(OH)_2$. Solid phase gypsum, indicated at 36, is a by-product of the process and is indicated at 37.

To balance the continuous or semi-continuous system chemically and prevent an overload of liquid phase sodium in the system, $Na_2SO_4$ is discharged by means of bleed-off 38 in the filtrate circuit of the filter press. To compensate for that loss of liquid in the system, make-up water 39 is added to the rinsate circuit of the filter press at 40. Such rinsate and make-up water report to oxidation unit 18 as indicated at 28.

As indicated above, control of pH within precipitation reactor 21, to a level between about 9.5 and 11.0, facilitates precipitation of magnesium hydrate particles presenting a desirable particle size of about 2–5 microns. Such pH level is maintained by addition of NaOH, 41, to the filtrate circuit of the belt filter at 42 for entry into the precipitation reactor. In the preferred embodiment such NaOH addition is carried out using a 50% NaOH solution for ease of handling.

While specific materials and process steps have been set forth for purposes of describing the preferred embodiment of the invention, various modifications can be resorted to, in light of the above teachings, without departing from applicant's novel contributions, therefore, in determining the scope of the present invention, reference shall be made to the appended claims.

What is claimed is:

1. A process for production of high-purity magnesium hydroxide from process aqueous slurry of a flue gas desulfurization system using magnesium-enhanced lime, comprising:

controlling aqueous slurry magnesium and sulfite ion content, and pH, during operation of said desulfurization system so as to facilitate recovery of magnesium sulfite hexahydrate crystals presenting low levels of impurities by controlling the chemistry of process aqueous slurry during operation of the desulfurization system so as to provide for:

i. a magnesium ion content of between about 5,000 to 12,000 ppm, ii. a sulfite ion content of between about 3,000 to 18,000 ppm, and iii. a pH of between about 6.0 to 7.0 so as to promote crystallization of magnesium sulfite hexahydrate crystals presenting low levels of impurities, removing a portion of said aqueous slurry from the desulfurization system, treating said removed aqueous slurry so as to crystalize magnesium sulfite hexahydrate crystals, oxidizing said crystals using hydrogen peroxide as an oxidizing agent, to obtain an aqueous solution of magnesium sulfate, reacting the resultant aqueous solution of magnesium sulfate with a basic material so as to precipitate magnesium hydroxide, separating the resultant magnesium hydroxide precipitate from the aqueous medium, rinsing the magnesium hydroxide precipitate to remove entrained impurities, and drying the magnesium hydroxide precipitate to obtain a high-purity magnesium hydroxide product.

2. The process of claim 1 for production of high-purity magnesium hydroxide, wherein said process is carried out as a semi-continuous process, and process system chemistry is maintained by:
  i. adding make-up water and sodium hydroxide to the process system, and
  ii. removing sodium sulphate from the process system.

3. The process of claim 2 for production of high-purity magnesium hydroxide, further comprising preparing the desulfurization system aqueous slurry using lime having a magnesium oxide content of between about 2 to 6% by weight.

4. The process of claim 1 for production of high-purity magnesium hydroxide, wherein the process slurry is bled off from the desulfurization system and is treated to recover magnesium sulfite crystals, by:
  i. cooling the solution to a temperature of between about 15 to 40° C., and
  ii. adjusting the pH of the solution to between about 7.0 and 7.5.

5. The process of claim 1 for production of high-purity magnesium hydroxide, wherein said oxidizing step is carried out by
  i. oxidizing said crystals by adding a 30% hydrogen peroxide solution to form resultant aqueous solution of magnesium sulfate, and
  ii. controlling proportions of oxidizing reactants (by weight) to be about:
    50 parts of water
    8 parts of magnesium hexahydrate crystals, and
    7 parts of 30% solution of $H_2O_2$.

6. The process of claim 1 for production of high-purity magnesium hydroxide, wherein said basic material for precipitation is selected from the group consisting of ammonium hydroxide, potassium hydroxide, and ammonia.

7. The process of claim 1 for production of high-purity magnesium hydroxide, wherein separating the magnesium hydroxide precipitate from the aqueous reaction medium is effected in a plate and frame filter press.

8. The process of claim 7 for production of high-purity magnesium hydroxide, wherein said magnesium hydroxide precipitate is rinsed with high purity water to remove entrained impurities, and the rinsed magnesium hydroxide precipitate is dried with forced air.

9. The process of claim 8 for production of high-purity magnesium hydroxide, further comprising
  i. regenerating sodium hydroxide from a sodium sulfate filtrate of said filter press separating process to obtain sodium hydroxide for re-use and gypsum as a by-product, and
  ii. circulating a rinsate, from the entrained impurities rinsing step for re-use in the magnesium sulfite oxidation reaction and magnesium hydroxide precipitation reaction.

10. The process of claim 9 for production of high-purity magnesium hydroxide, wherein calcium hydroxide is used to regenerate the sodium hydroxide.

11. The process of claim 10 for production of high-purity magnesium hydroxide, wherein the sodium hydroxide is separated by a belt filter for re-use in the system and the gypsum is recovered as a by-product.

12. The process of claim 2 for production of high-purity magnesium hydroxide, wherein said process is maintained as a semi-continuous process by:
  i. adding said make-up water to the oxidization reaction,
  ii. adding said sodium hydroxide to the precipitation reaction, and
  iii. removing said sodium sulfate from a filtrate of the precipitate separating process.

* * * * *